Patented Sept. 2, 1952

2,609,396

UNITED STATES PATENT OFFICE 2,609,396

COMPOUNDS WITH THE CARBON SKELETON OF BETA-CAROTENE AND PROCESS FOR THE MANUFACTURE THEREOF

Hans Herloff Inhoffen and Horst Pommer, Braunschweig, Germany

No Drawing. Application May 17, 1951, Serial No. 226,944. In Germany May 24, 1950

4 Claims. (Cl. 260—617)

The present invention relates to the manufacture of a novel condensation product with the carbon skeleton of β-carotene which may be represented by the following formula:

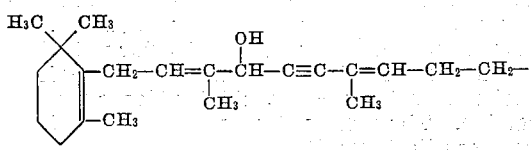

According to the present invention, this compound can be prepared by condensing 4-[2',6',6'-trimethylcyclohexane - (1') - yl] - 2 - methylbutene-(2)-al-(1) with a compound of the general formula $$XC{\equiv}C-\underset{\underset{CH_3}{|}}{C}=CH-CH_2-CH_2-CH=\underset{\underset{CH_3}{|}}{C}-C{\equiv}CX$$

wherein X stands for a lithium radical or a magnesium-bromide radical; and hydrolyzing the resulting salt of the general formula

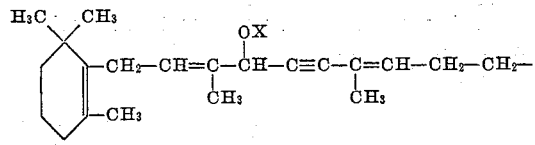

The course of the new process, when using, for instance, the lithium compound of 3,8-dimethyldecadiene-(3,7)-diyne-(1,9) as starting material, can be illustrated by the following formula scheme:

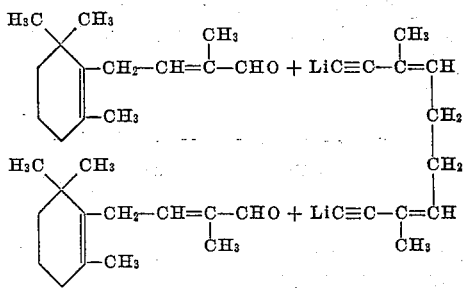

↓ Condensation

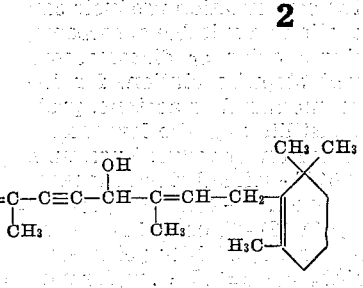

↓ Hydrolysis

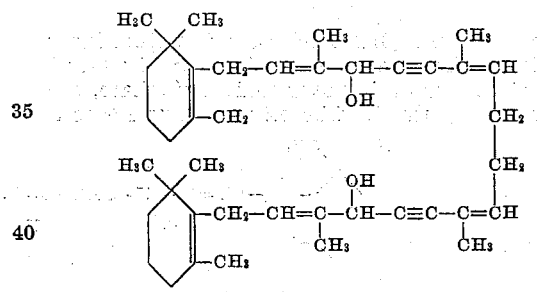

The compound obtained according to the present invention is a valuable intermediate product for the preparation of biologically active substances of the kind of β-carotene.

The starting materials of the process may be obtained as follows:

4 - [2',6',6' - trimethylcyclohexene - (1') - yl]-2-methylbutene-(2)-al-(1) by glycide ester synthesis from β-ionone and chloroacetic ester and treatment with alkali of the glycide ester formed (Isler et al., "Helvetica Chimica Acta," volume 30, year 1947, page 1911).

3,8-dimethyldecadiene - (3,7) - diyne-(1,9) is formed by dimerizing 1-bromo-3-methylpentene-(2)-yne-(4) by means of a Wurtz reaction. For condensation purposes, it is advantageous to employ a metal pair, for instance, a Zn-Cu-pair, in place of pure zinc. The compound boils at 40–

50° C./0.005 mm. Hg; $n_D^{20}=1.5051$; ultraviolet absorption maximum 230 m$\mu$.

The condensation between 2 mols of 4-[2',6',6'-trimethylcyclohexene-(1')-yl-]-2-methylbutene-(2)-al-(1) and 1 mol of 3,8-dimethyldecadiene-(3,7)-diyne-(1,9) is effected by metal-organic synthesis. Apart from the Grignard compound, the lithium-organic compound is particularly suitable. Ether, anisole, benzene, toluene or xylene may serve as solvents. The hydrolysis of the salts of the condensation product formed can be effected by means of water, ammonium chloride, dilute sulphuric acid or phosphoric acid.

The isolation of the condensation products can be achieved by adsorption on suitable adsorbents, for instance, aluminum oxide or diatomaceous earth and subsequent stepwise elution, for instance, with benzene, methanol or acetone, preferably, however, by distilling off the low-molecular by-products formed under reduced pressure.

The 1,18-di-[2',6',6'-trimethylcyclohexene-(1')-yl]-3,7,12,16-tetramethyl-4,15-dihydroxy-octadecatetraene-(2,7,11,16)-diyne-(5,13) thus obtained is an almost solid, slightly yellow-coloured oil, boiling point 0.000 001=135° C. under partial decomposition; ultraviolet absorption maximum 233 m$\mu$.

*Example 1*

3 grams of 3,8-dimethyldecadiene-(3,7)-diyne-(1,9) are dissolved in 50 cc. of absolute ether and 10 cc. of an ethereal solution of lithium phenyl (containing 290 mg.=2.1 mol of lithium) are added. The milky solution is refluxed for 45 minutes. 12 grams of 4-[2',6',6'-trimethylcyclohexene-(1')-yl]-2-methylbutene-(2)-al-(1), dissolved in 50 cc. of ether, are then added and heated to boiling for one hour. The solution thereby turns orange and becomes clear. After cooling down, the solution is poured onto a mixture of ice and

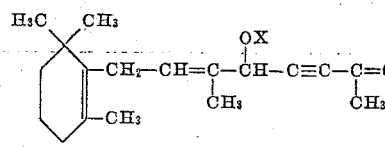

10 per cent. phosphoric acid, and the ether layer which has become almost colourless is washed neutral. After drying over sodium sulphate, the ether is evaporated. The ether residue forms a

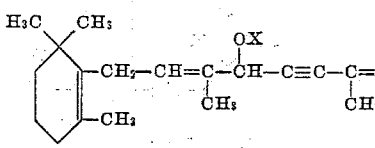

viscous oil which, for purification purposes, is distilled in a molecular still from a thin film at a pressure of $10^{-6}$ mm. Hg and at a temperature of 110° C. 10 grams of a product having a molecular weight of 578 (calculated 570.87) and an ultraviolet absorption maximum of 233 m$\mu$ ($\epsilon$=21,000) remain behind as residue. The yield amounts to 93 per cent. of the theoretical quantity.

*Example 2*

A Grignard solution is prepared from 2.5 grams of magnesium and 10.3 grams of ethyl bromide. 50 cc. of absolute toluene are added to this solution and the ether is evaporated in vacuo. 5 grams of 3,8-dimethyldecadiene-(3,7)-diyne-(1,9) are added to this Grignard solution and the mixture is heated to a bath temperature of 80° C. for 30 minutes. While standing a flaky precipitate separates which re-dissolves upon addition of ether. After addition of 28 grams of 4-[2',6',6'-trimethylcyclohexene-(1')-yl]-2-methylbutene-(2)-al-(1), the mixture is allowed to stand overnight and finally heated for an hour to 50° C. The Grignard solution is thereupon decomposed with ice and 10 per cent. sulphuric acid, and the ether solution is well washed successively with sodium bicarbonate solution and water. After drying with sodium sulphate, the ether is evaporated and the toluene is distilled off in vacuo. 33 grams of a dark oil remain behind as residue. The excess 4-[2',6',6'-trimethylcyclohexene-(1')-yl]-2-methylbutene-(2)-al-(1) and low-molecular by-products are distilled off in high vacuo at $10^{-3}$ mm. Hg and an air bath temperature of 90° C. The residue, which amounts to 14 grams, is dissolved in petroleum ether and purified chromatographically with the aid of aluminum oxide (Brockmann, activity grade III). 6.5 grams of a viscous oil with a molecular weight of 481 and a maximal absorption in the ultra-violet spectrum at 233 m$\mu$ are obtained as a middle fraction. The yield amounts to 36 per cent. of the theoretical quantity.

We claim:

1. Process for the manufacture of a condensation product with the carbon skeleton of $\beta$-carotene, comprising condensing 2 mols of 4-[2'6',6'-trimethylcyclohexene-(1')-yl]-2-methylbutene-(2)-al-(1) with a compound of the general formula

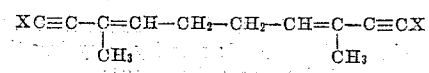

wherein X is selected from the group consisting of a lithium radical and a magnesium monobromide radical; and hydrolyzing the resulting salt of the general formula:

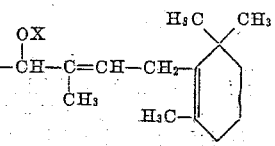

2. Process according to claim 1, comprising effecting the condensation with the aid of lithium in ether and hydrolyzing with phosphoric acid.

3. Compounds of the general formula

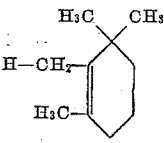

wherein X is selected from the group consisting of a lithium radical and a magnesium monobromide radical.

4. As a new compound: 1,18-di-[2',6',6'-trimethylcyclohexene-(1')-yl]-3,7,12,16-tetramethyl-4,15-dihydroxyoctadecatetraene-(2,7,11,16)-diyne-(5,13).

HANS HERLOFF INHOFFEN.
HORST POMMER.

REFERENCES CITED

The following references are of record in the file of this patent:

Z. Vitamin-forsch, vol. 17, pages 88–97 (1946), abstracted in Chemical Abstracts, vol. 41, page 5600.